US012668470B2

(12) United States Patent
Iotti

(10) Patent No.: US 12,668,470 B2
(45) Date of Patent: Jun. 30, 2026

(54) ROTARY TELEHANDLER

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 268 days.

(21) Appl. No.: 18/519,387

(22) Filed: Nov. 27, 2023

(65) Prior Publication Data

US 2024/0208783 A1 Jun. 27, 2024

(30) Foreign Application Priority Data

Dec. 23, 2022 (IT) ........................ 102022000026658

(51) Int. Cl.
*B66F 9/24* (2006.01)
*B66F 9/065* (2006.01)

(52) U.S. Cl.
CPC .............. *B66F 9/0655* (2013.01); *B66F 9/24* (2013.01)

(58) Field of Classification Search
None
See application file for complete search history.

(56) References Cited

U.S. PATENT DOCUMENTS

| | | | | |
|---|---|---|---|---|
| 11,565,922 | B2 * | 1/2023 | Iotti | B66F 9/07559 |
| 11,808,009 | B2 | 11/2023 | Iotti | |
| 2015/0247303 | A1 | 9/2015 | Copeland et al. | |
| 2021/0180290 | A1 | 6/2021 | Iotti | |

FOREIGN PATENT DOCUMENTS

| | | |
|---|---|---|
| EP | 3838829 | 6/2021 |
| JP | S53118301 U | 9/1978 |
| JP | 2003276991 | 10/2003 |
| JP | 2022071394 | 5/2022 |

OTHER PUBLICATIONS

Italian Search Report issued Jul. 4, 2023, in Italian App. No. IT 202200026658, 8 pages.

* cited by examiner

*Primary Examiner* — Michael S Lowe

(74) *Attorney, Agent, or Firm* — Chrisman Gallo Tochtrop LLC

(57) ABSTRACT

A rotary telehandler including a carriage movable on wheels, a tower mounted rotatably on the carriage, an actuating device configured for rotating the tower with respect to the carriage, a pin movable between a first position, wherein the pin prevents a relative rotation between the tower and the carriage, and a second position wherein the pin allows a relative rotation between the tower and the carriage. The telehandler includes an electric actuator and a mechanical mechanism connected or connectable to the pin and to the electric actuator, the electric actuator is configured to move, by means of the mechanical mechanism, the pin between the first position and the second position and to apply a pushing force on the pin to keep the pin in the first position for locking the telehandler in an operating condition of road travel wherein the tower is aligned with an axis of the carriage.

12 Claims, 6 Drawing Sheets

Fig.3A
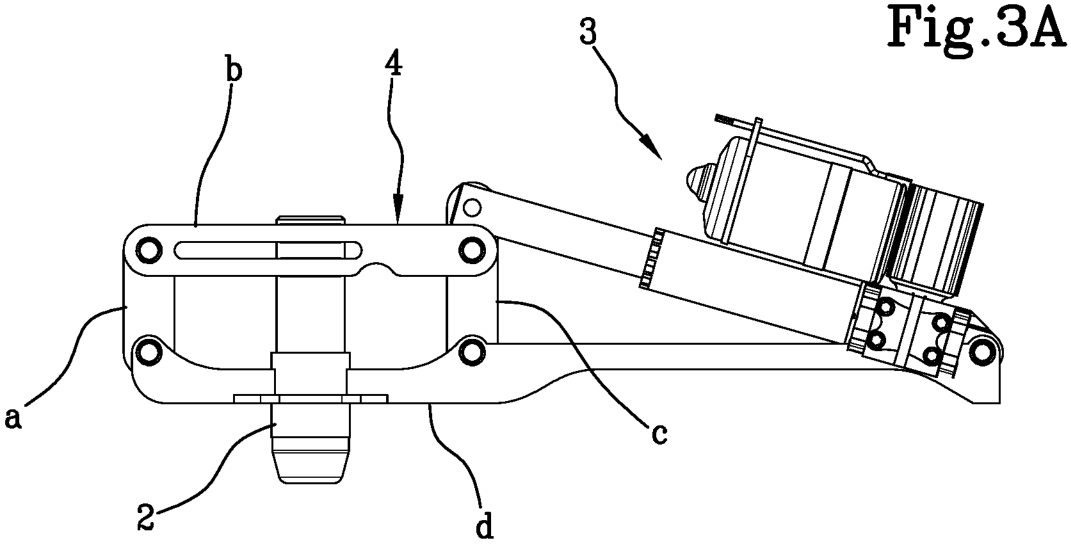
Fig.3B
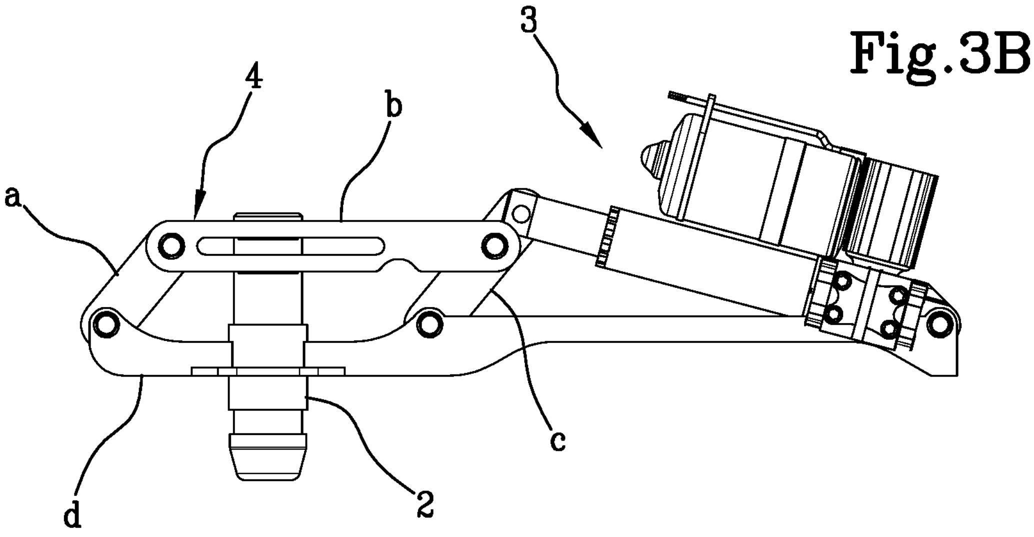
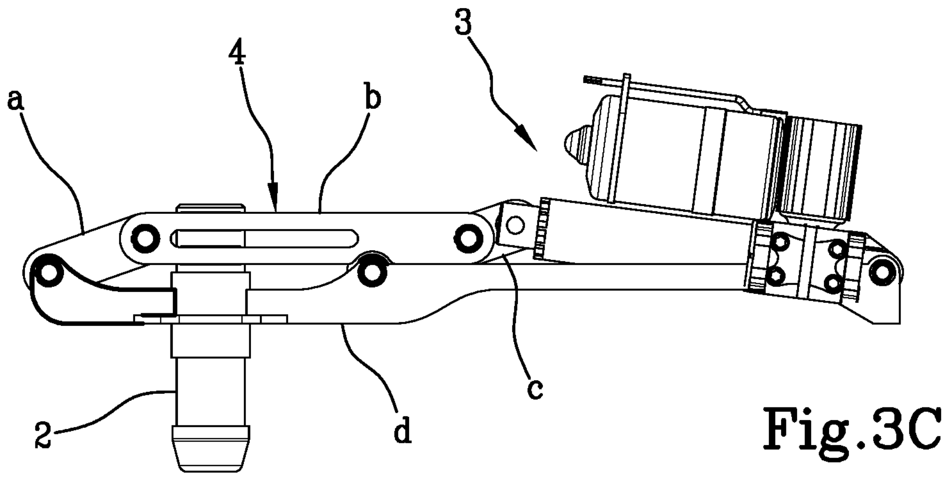
Fig.3C

ROTARY TELEHANDLER

This invention relates to an improved rotary telehandler.

Telehandlers can travel on roads either transported on a trailer or autonomously, if approved for road travel. In both cases, this is only permitted in accordance with specific national regulations governing road traffic in the various countries.

These regulations require that the operator prepares the telehandler with a specific alignment before introducing it into road travel, to avoid the risk of accidents, damage to buildings or putting at risk the safety of drivers, cyclists and pedestrians.

More in detail, if a rotary telehandler is used, the telehandler is not allowed to travel without the tower being aligned with the axis of the carriage.

For this purpose, once aligned with the axis of the carriage, the tower is locked by a pin interposed between the tower and the carriage.

Currently, the pin is inserted manually by the operator or it is actuated by a hydraulic actuator controlled from the cab of the telehandler.

Disadvantageously, the manual solution does not provide significant guarantees of reliability and it is extremely inconvenient for the operator, whilst the hydraulic actuator has high costs.

Moreover, in the sector of operating machines there is a gradual electrification of the propulsion and of the drives which is resulting in the emergence of the need to reduce or eliminate the use of the hydraulic drives.

The technical purpose of the invention is therefore to provide a rotary telehandler which is able to overcome the drawbacks of the prior art.

The technical purpose indicated and the aims specified are substantially achieved by a rotary telehandler comprising the technical features described in one or more of the appended claims. The dependent claims correspond to possible embodiments of the invention.

Further features and advantages of the invention are more apparent in the non-limiting description which follows of a non-exclusive embodiment of a rotary telehandler. The description is set out below with reference to the accompanying drawings which are provided solely for purposes of illustration without restricting the scope of the invention and in which.

Figure 2:
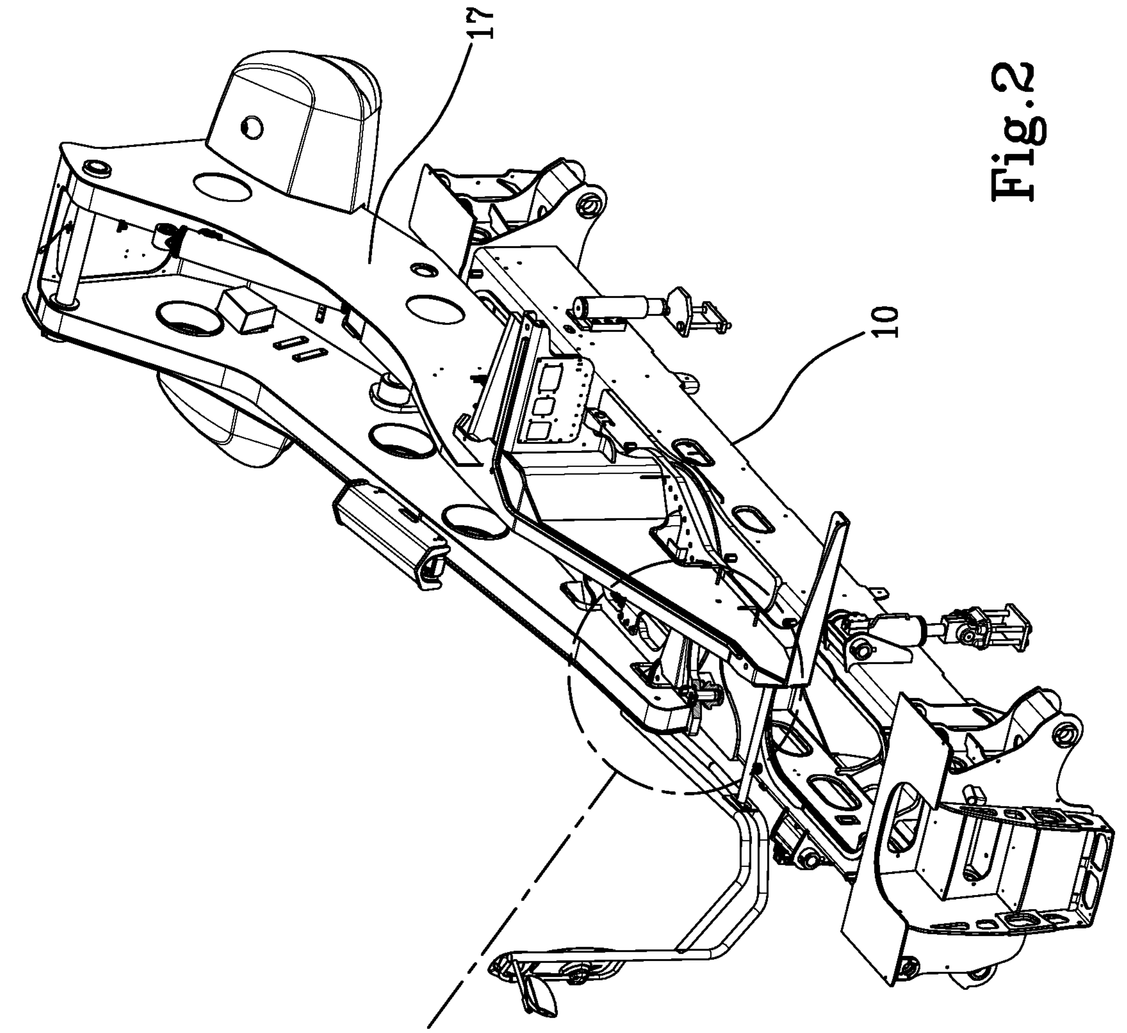
FIG. 2 is an axonometric view of the invention.
Figure 2A:
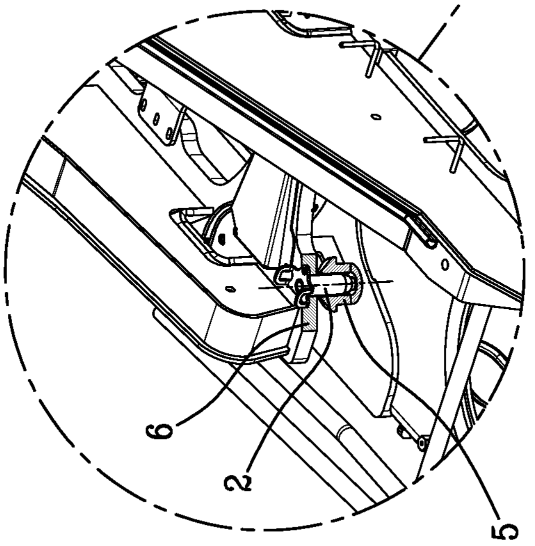

FIG. 2*a* is a detail of FIG. 2.

Figure 4C:
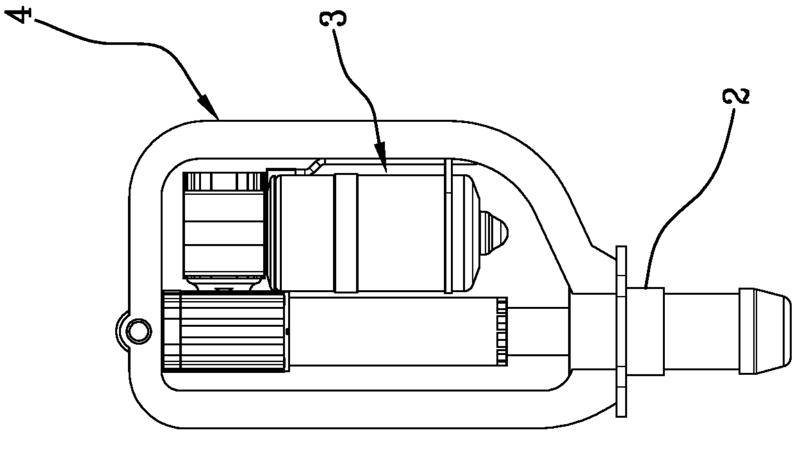
Figure 4B:
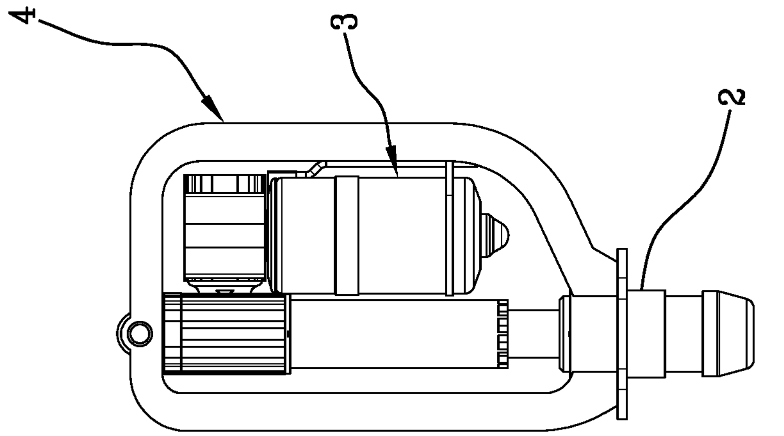
Figure 4A:
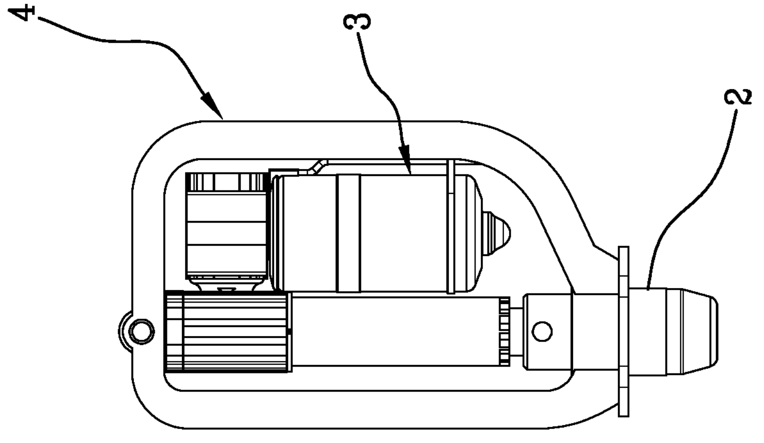
Figure 5A:
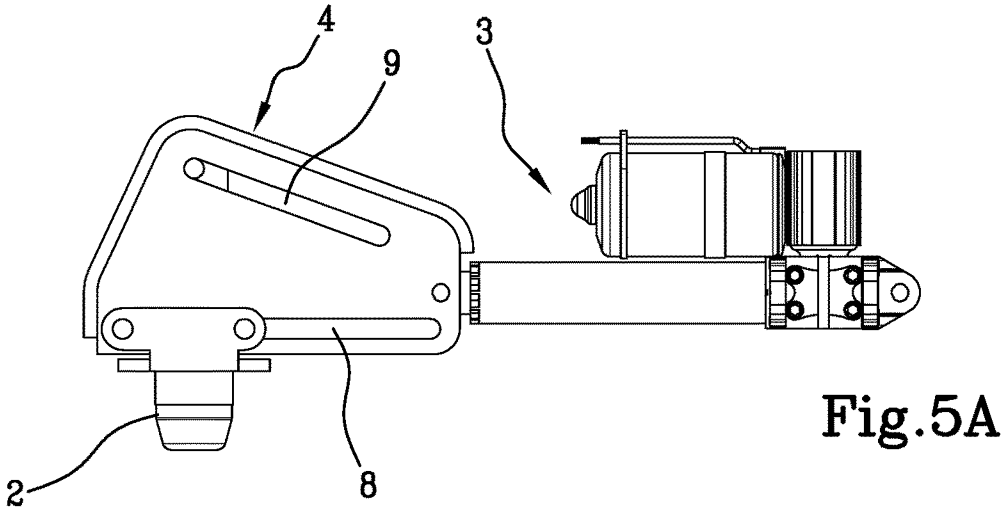
Figure 5B:
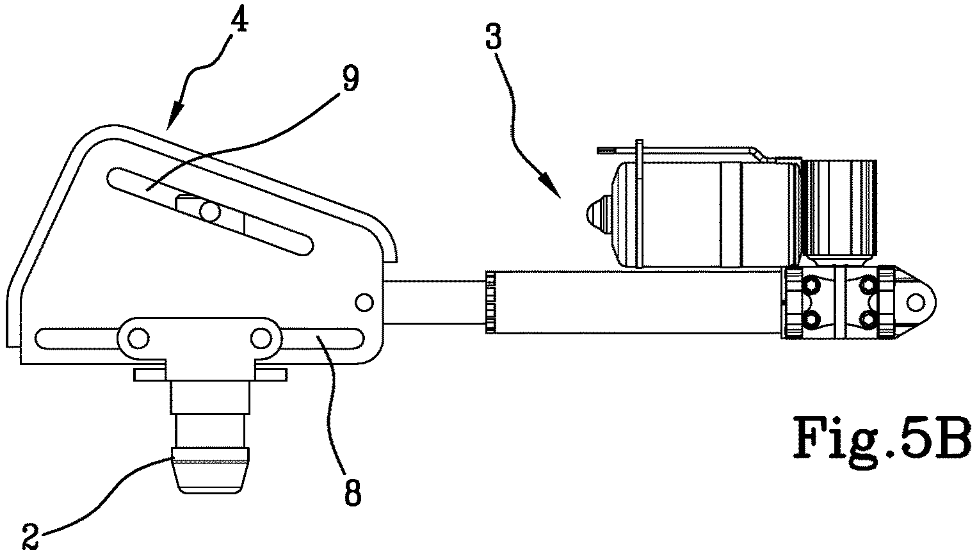
Figure 5C:
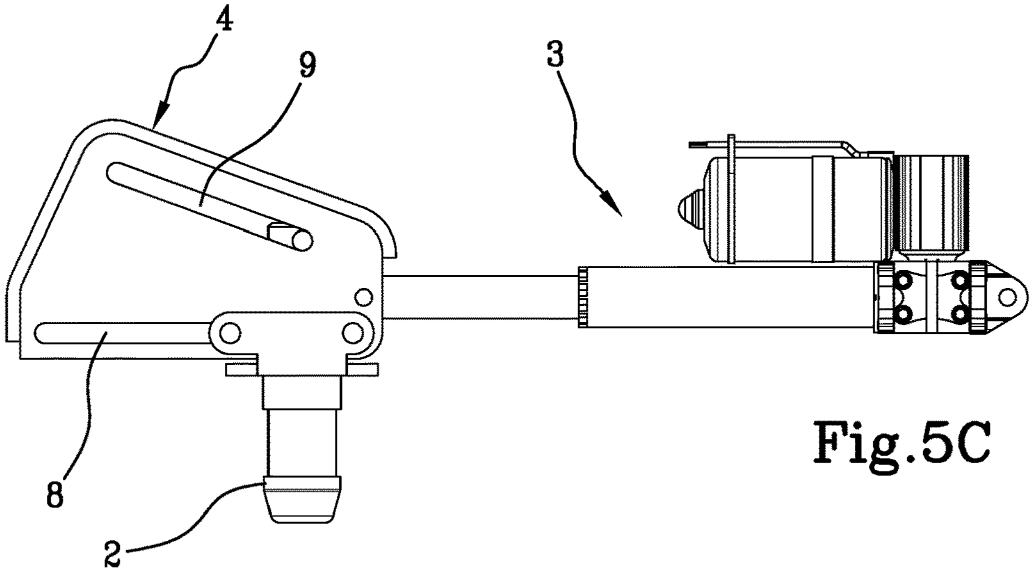
Figure 6A:
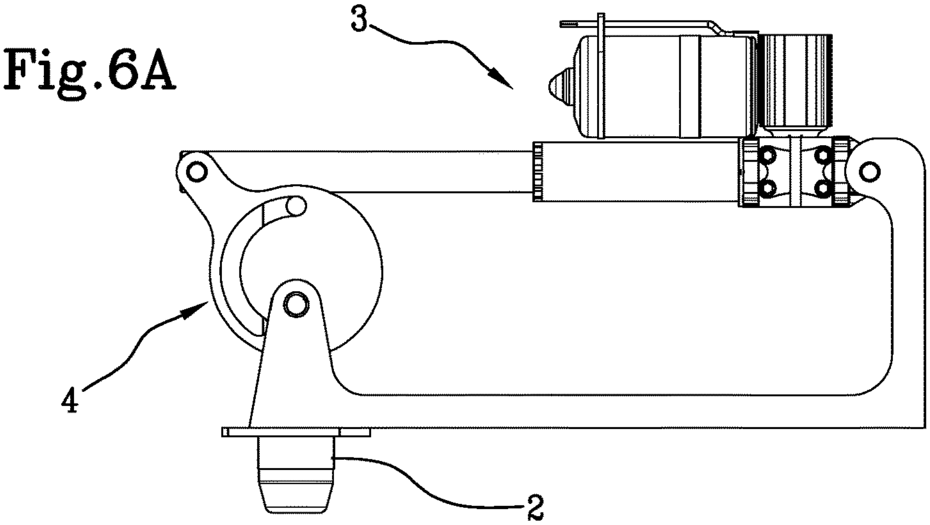
Figure 6B:
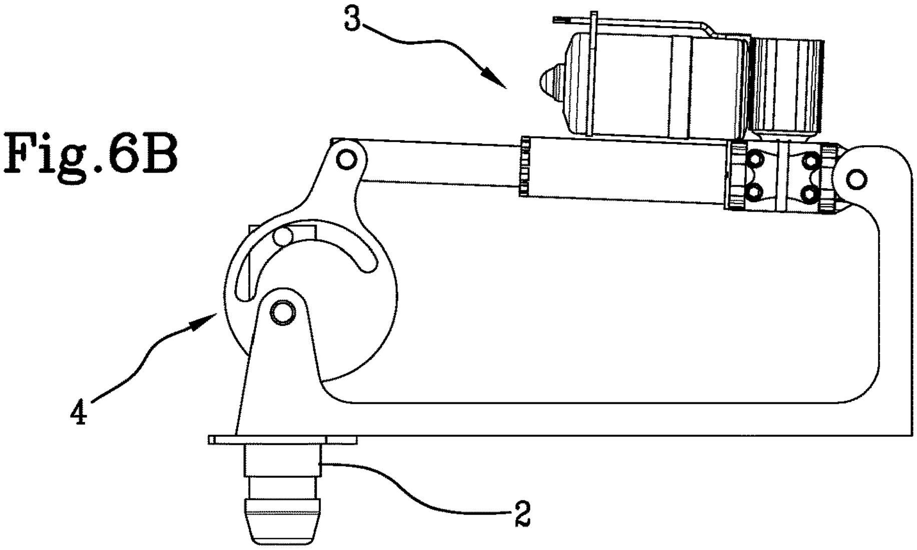
Figure 6C:
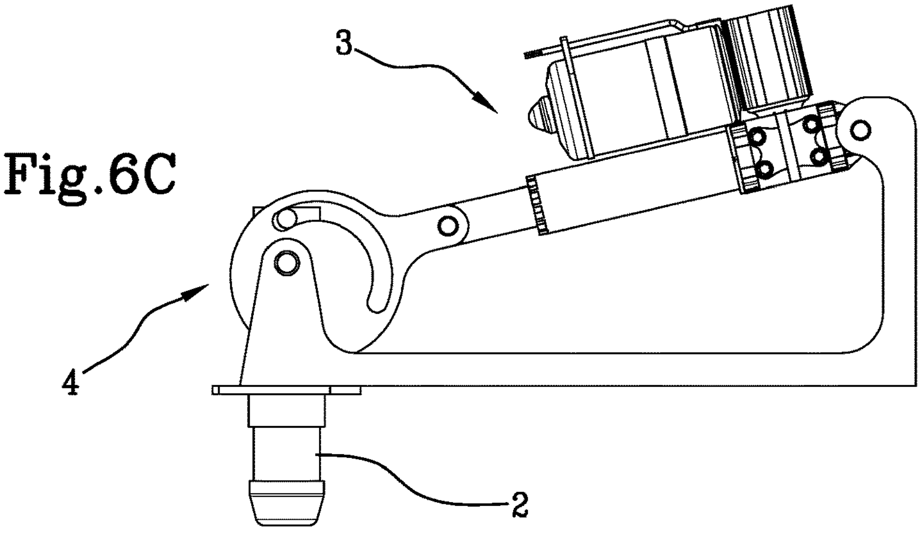

FIGS. 3A, 3B and 3C are schematic views of a first possible embodiment of the invention;

FIGS. 4A, 4B and 4C are schematic views of a second possible embodiment of the invention;

FIGS. 5A, 5B and 5C are schematic views of a third possible embodiment of the invention;

FIGS. 6A, 6B and 6C are schematic views of a fourth possible embodiment of the invention.

With reference to the accompanying drawings, the numeral 1 denotes in its entirety a rotary telehandler which, for simplicity of description, will hereafter be referred to as the telehandler 1.

Figure 1:
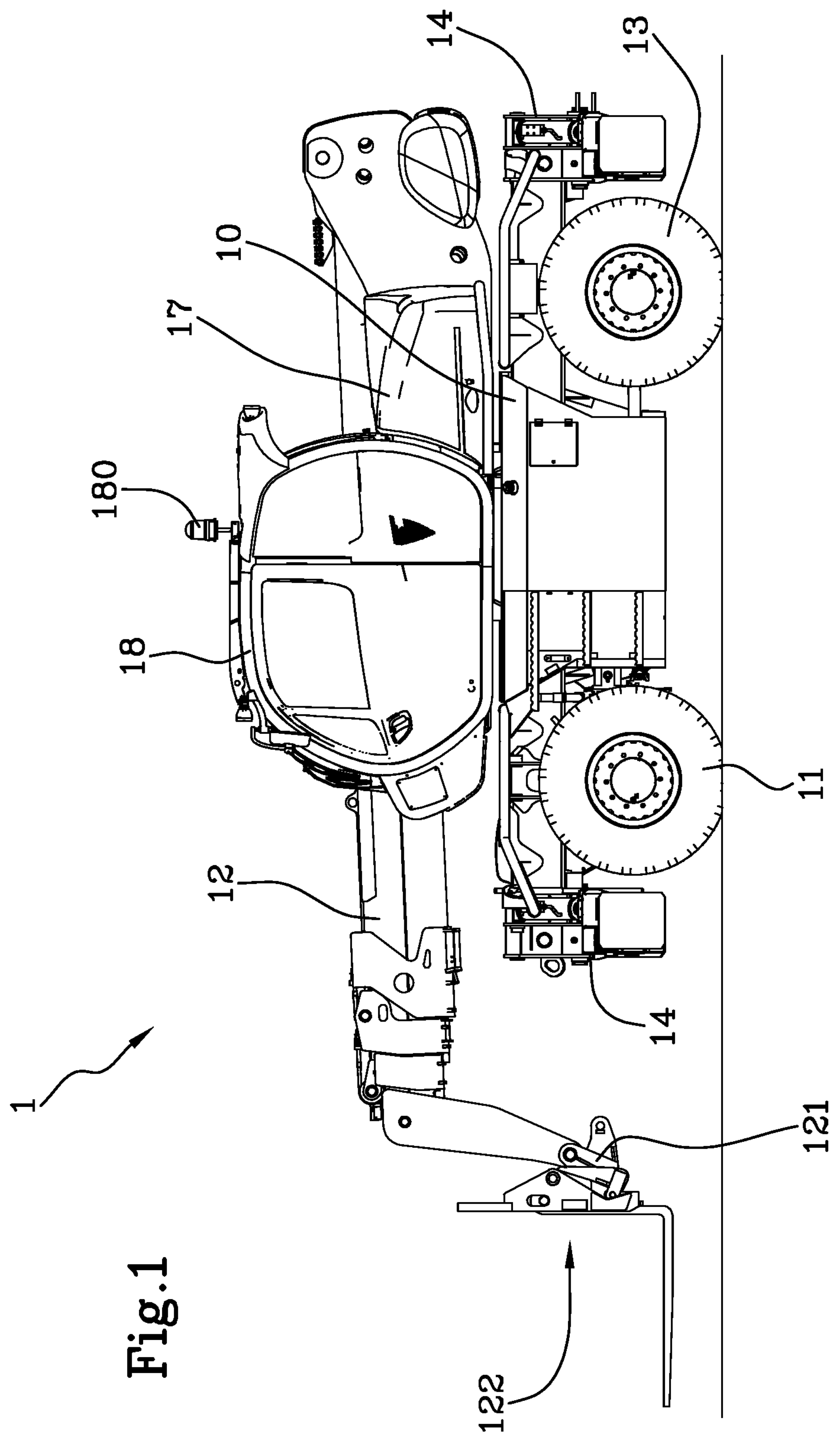
FIG. 1 is a side view of a telehandler according to the invention.

As shown in FIG. 1, the telehandler 1 is equipped with a carriage 10 movable on wheels 11, 13 and a telescopic operating boom 12, designed to lift and move loads. The telehandler 1 may be equipped with stabilizers 14 comprising a plurality of stabilizing arms.

The operating boom 12 can be extended and inclined about a hinge with a horizontal axis and is equipped, at its distal end, with a quick coupling device 121 which allows the removable coupling of equipment 122 which picks up and carries the load, such as forks, plaforms, winches and other similar equipment.

The rotary telehandler 1 (as shown in the drawings), unlike the fixed one, has a rotatable turret 17, also known as the "platform", mounted on the carriage 10.

The telehandler 1 also comprises a pin 2 movable between a first position, wherein the pin 2 prevents a relative rotation between the turret 17 and the carriage 10, and a second position wherein the pin 2 allows a relative rotation between the turret 17 and the carriage 10. In other words, in the first position the pin 2 is designed to lock the relative rotation between the turret 17 and the carriage 10 whilst in the second position the pin 2 is positioned, relative to the turret 17 and to the carriage 10, in such a way as to not interfere with them.

Preferably, the movement between the first position and the second position of the pin 2 is a vertical movement.

Associated with the pin 2 and with the electric actuator 3, the telehandler 1 also comprises a mechanical mechanism 4. The mechanical mechanism 4 is interposed between the pin 2 and the electric actuator 3. In particular, the mechanical mechanism 4 is connected or connectable both to the pin 2 and to the electric actuator 3.

The electric actuator 3 is configured to move, by means of the mechanical mechanism 4, the pin 2 between the first position and the second position. In this way, a solution more economical than the hydraulic one is obtained, because the implementation of electric actuators 3 is less expensive, but equally reliable due to the use of mechanical mechanisms 4.

The electric actuator 3, by means of the mechanical mechanism 4, also has the purpose of exerting a thrust force on the pin 2 so that, when it is in the first position, the pin 2 locks the telehandler 1 in an operating condition of road travel wherein the turret 17 is aligned with the axis of the carriage 10.

Preferably, and as shown in the accompanying drawings, the carriage 10 and the turret 17 respectively comprise a first seat 5 and a second seat 6. The first seat 5 and the second seat 6 are aligned with each other in the operating condition of road circulation. During the operating condition of road circulation the pin 2, which is in the first position, is configured to be inserted at least partly in the first seat 5 and in the second seat 6.

In other words, the locking occurs thanks to the pin 2 which inserts into the seats 5 and 6 which can be aligned with each other.

The two seats 5, 6 guarantee a geometrical connection for the pin 2 when the latter is established in the first position.

According to a possible embodiment, the electric actuator comprises or consists of a jack 3, and it may also comprise or consist of other devices suitable for the purpose.

The jack 3 allows the multiplication of the force applied, using the lever principle.

In that case, the mechanical mechanism 4 is connected or connectable to the jack 3 in such a way as to transmit a motion of the jack 3 to the pin 2.

The linear translation generated by the electric jack 3 allows the movement in both directions of translation of the pin 2, and within a predetermined stroke or extension of the linear movement. For example, with reference to the embodiment shown in the accompanying drawings wherein the pin 2 moves vertically, the electric jack 3 (by means of the mechanical mechanism 4) allows both a lifting and lowering motion of the pin 2.

The movement of the pin 2 may occur through the mechanical mechanism 4 guided by the jack 3.

According to an alternative embodiment, the movement of the pin 2 may occur directly.

There are different configurations which see in combination the jack 3 and the mechanical mechanism 4 in order to amplify the thrust force of the pin 2.

According to a possible embodiment, the mechanical mechanism 4 is made in the form of a four-bar linkage.

The four-bar linkage is a kinematic chain consisting of four rigid elements connected in pairs by rotoidal couples or hinge pins.

As shown, for example, in FIGS. 3A-3C, the four-bar linkage is made using four rods "a", "b", "c", "d", connected by a hinge at the end points "A", "B", "C", "D" (FIGS. 3A, 3B and 3C).

According to this configuration the pin 2 is connected or connectable to at least one of the elements of the four-bar linkage, whilst the jack 3 is connected or connectable to a hinge and/or to two elements of the four-bar linkage.

In the specific case of FIGS. 3A-3C, the pin 2 is connected in an integral fashion to the element "b", which by means of its relative motion with respect to the element "d" (which in the accompanying drawings represents the fixed element of the four-bar linkage) allows the vertical translation of the pin 2.

Preferably, the fixed element, that is to say, the rod "d" in FIGS. 3A, 3B and 3C, lies in the plane closest to the carriage 10, and has a hole, which allows the passage of the pin 2 inside it when it is in the first position.

In other words, the fixed element "d", which allows the vertical movement of the pin 2 through it, is parallel to the element "b" which applies the thrust on the pin 2.

In the case illustrated in FIGS. 3A, 3B and 3C, the jack 3 is connected to the hinge "C", thus constraining to itself the direct movement of the two elements "b" and "c", and indirectly the movement of the rod "a" parallel to the element "c".

FIG. 3A shows the pin 2 in the second position, that is, the release position. The pin 2 is disengaged from the seats 5 and 6, allowing the rotation of the turret 17 on the carriage 10. The jack 3 is completely extended, so as to move the elements "a" and "c" perpendicular to the plane and consequently create right angles with the remaining elements.

FIG. 3B shows an intermediate position wherein the jack 3 retracts towards the electric actuator 3, leading with its movement to a vertical translation downwards of the pin 2.

In this passage position, the pin 2 will be at least partly inserted in the seats 5 and 6 of the respective carriage 10 and turret 17.

FIG. 3C shows the pin 2 in its first position. In this configuration the pin 2 protrudes completely through the element "d" and will allow the locking of the turret 17 on the carriage 10. The jack 17 is at the end of its stroke and adjacent to the fixed element "d".

According to another possible embodiment, shown in FIGS. 4A, 4B and 4C, the mechanical mechanism 4 is made in the form of a worm screw.

The jack 3 is connected or connectable to a pinion of the worm screw in such a way as to be able to transform a rotational movement of the pinion into a translational movement of the pin 2.

In other words, the jack 3 allows the movement of the electric actuator 3 to be transformed into a linear movement of traction and compression, transmitted or transmittable to the pin 2. FIG. 4A shows the jack 3 completely retracted, establishing the pin 2 in the second position. FIG. 4C shows the pin 2 in its first position and the jack 3 completely extended in the act of transferring a compression to the pin 2.

According to a further embodiment, shown in FIGS. 5A, 5B and 5C, the mechanical mechanism 4 is made in the form of a plate connected or connectable to the jack 3. The plate comprises a first guide 8, extending parallel to the direction of translation of the jack 3, and a second guide 9, inclined relative to the first guide 8.

In other words, the mechanical mechanism 4, connected or connectable to the jack 3, comprises a first guide 8, coplanar with the jack 3, and a second guide 9, inclined relative to the first guide 8.

The pin 2 is slidably connected or connectable to the first and to the second guides 8, 9.

The first guide 8 allows the pin 2 to be kept in position.

More specifically, the pin 2 slides vertically inside the mechanical mechanism 4 depending on the horizontal movement of the second inclined guide 9.

In other words, the horizontal translation of the mechanical mechanism 4 translates into a vertical translation of the pin 2.

The guide 8 is therefore perpendicular to the translating movement of the pin 2, whilst the guide 9 is located above and oblique to the first guide 8. In this configuration the jack 3 is connected or connectable to the mechanical mechanism 4 and the first guide 8 is coplanar with the jack 3. The guide 9 guarantees a horizontal movement of the mechanical mechanism 4 relative to the electric actuator 3 given by the extension of the jack 3. During this horizontal movement of the mechanical mechanism 4, the passage also occurs, thanks to the second guide 9, between the first position and the second position of the pin 2. In effect, the pin 2 is free to move only vertically and using the principle of the inclined plane, given by the second oblique guide 9, it is possible to transform the horizontal movement of the sliding of the jack 3, relative to the mechanical mechanism 4, into a vertical movement of the pin 2.

In FIG. 5A, the jack 3 is completely retracted, the mechanical mechanism 4 is close to the electric actuator 3 and the pin 2 is stable in the second position.

FIG. 5B shows a partial extension of the jack 3 with a consequent moving away of the mechanical mechanism 4, which translates into a lowering of the pin 2. As the mechanism 4 moves away from the electric actuator 3, the pin 2 slides along the two guides 8 and 9. In particular, the second inclined guide 9 transforms the horizontal movement of the mechanical mechanism 4 into a vertical movement of the pin 2.

In FIG. 5C the jack 3 will be at the end of its sliding and the pin 2 will be completely lowered inside the seats 5 and 6 of the turret and of the carriage 10.

According to a further embodiment, shown in FIGS. 6A, 6B and 6C, the mechanical mechanism 4 is made in the form of an eccentric body. The eccentric body comprises a guide in which the pin 2 is connected or connectable in a slidable fashion.

The eccentric body is rotated by means of the jack 3.

The rotation of the eccentric body translates the pin 2.

The eccentric body has the shape of a circular disc and is rotatable about an axis normal to the plane of the disc and not passing through the centre of this. The eccentric body is coupled with two contiguous members, connecting rod and frame, with which it forms a rotoidal pair. The jack 3 rotates the mechanical mechanism 4 which, by means of the guide of the eccentric body, transmits to the pin 2 a vertical translational movement. In this case, the pin 2 is connected or connectable to the axis normal to the plane of the disc of the eccentric body.

All the mechanical mechanisms 4 mentioned above describe only some of the possible embodiments which may be used to amplify the thrust force of the electric actuator 3, an example of which is the jack mentioned several times, which may be replaced by other actuators suitable for the purpose. In other words, the mechanical mechanisms 4 described above define a non-exhaustive list of possible mechanisms which can be used for moving the pin 2.

Each of them may be associated with an automated remote control in order to improve its reliability and facilitate the monitoring. The control may be operated by means of the commands present in the cabin or by a remote control.

The invention claimed is:

1. A rotary telehandler (1) comprising:

a carriage (10) movable on wheels;

a turret (17) rotatably mounted on said carriage (10);

an actuating device configured for rotating said turret (17) relative to said carriage (10);

a pin (2) movable between a first position, wherein said pin (2) prevents a relative rotation between said turret (17) and said carriage (10), and a second position wherein said pin (2) allows a relative rotation between said turret (17) and said carriage (10);

the rotary telehandler further comprises an electric actuator (3) and a mechanical mechanism (4) connected or connectable to said pin (2) and to said electric actuator (3);

said electric actuator (3) being configured for moving, by means of said mechanical mechanism (4), said pin (2) between said first position and said second position and for exerting a thrust force on said pin (2) to keep the pin (2) in said first position for locking said telehandler (1) in an operating condition of road travel wherein the turret (17) is aligned with an axis of said carriage (10);

wherein said electric actuator (3) comprises a jack and wherein said mechanical mechanism (4) is connected or connectable to said jack in such a way as to transmit a motion of the jack to said pin (2); and wherein the jack and mechanical mechanism (4) are configured in such a way as to amplify the thrust force exerted by the electric actuator (3) on the pin (2).

2. The telehandler (1) according to claim 1, wherein said movement between the first position and the second position of said pin (2) is a vertical movement.

3. The telehandler (1) according to claim 1, wherein said carriage (10) and said turret (17) comprise, respectively, a first seat (5) and a second seat (6); wherein said first seat (5) and said second seat (6) are aligned with each other in said operating condition of travel of the telehandler (1) and wherein said pin (2) is configured to be inserted at least partly in said first seat (5) and in said second seat (6) when in said first position.

4. The telehandler (1) according to claim 1, wherein said mechanical mechanism (4) is made in the form of a four-bar linkage, wherein said pin (2) is connected or connectable to at least one element of said four-bar linkage and wherein said electric actuator (3) is connected or connectable to a hinge and/or to two elements of said four-bar linkage.

5. The telehandler (1) according to claim 4, wherein said four-bar linkage comprises four bars, wherein each bar is connected by hinges to two of the other bars.

6. The telehandler (1) according to claim 1, wherein said mechanical mechanism (4) is made in the form of a worm screw, and wherein said electric actuator (3) is connected or connectable to a pinion of the worm screw in such a way as to transform a rotational movement of said pinion into a translational movement of said pin (2).

7. The telehandler (1) according to claim 1, wherein said mechanical mechanism (4) is made in the form of a plate connected or connectable to said electric actuator (3), said plate comprising a first guide (8) extending parallel to a direction of translation of said electric actuator (3) and a second guide (9), inclined relative to said first guide (8), wherein said pin (2) is slidably connected or connectable to said first guide (8) and to said second guide (9).

8. The telehandler (1) according to claim 1, wherein said mechanical mechanism (4) is made in the form of an eccentric body comprising a guide in which said pin (2) is connected or connectable in a slidable fashion, said eccentric body being rotated by said electric actuator (3) and wherein said rotation of the eccentric body causes said pin (2) to translate.

9. The telehandler (1) according to claim 1, wherein said mechanism is directly connected to said jack of said actuator.

10. A rotary telehandler (1) comprising:

a carriage (10) movable on wheels;

a turret (17) rotatably mounted on said carriage (10);

an actuating device configured for rotating said turret (17) relative to said carriage (10);

a pin (2) movable between a first position, wherein said pin (2) prevents a relative rotation between said turret (17) and said carriage (10), and a second position wherein said pin (2) allows a relative rotation between said turret (17) and said carriage (10);

characterised in that it the rotary telehandler further comprises an electric actuator (3) and a mechanical mechanism (4) connected or connectable to said pin (2) and to said electric actuator (3);

said electric actuator (3) being configured for moving, by means of said mechanical mechanism (4), said pin (2) between said first position and said second position and for exerting a thrust force on said pin (2) to keep the pin (2) in said first position for locking said telehandler (1) in an operating condition of road travel wherein the turret (17) is aligned with an axis of said carriage (10);

wherein said electric actuator (3) comprises a jack and wherein said mechanical mechanism (4) is connected or connectable to said jack in such a way as to transmit a motion of the jack (7) to said pin (2);

wherein said mechanical mechanism (4) is made in the form of a plate connected or connectable to said electric actuator (3), said plate comprising a first guide (8) extending parallel to a direction of translation of said electric actuator (3) and a second guide (9), inclined relative to said first guide (8), wherein said pin (2) is slidably connected or connectable to said first guide (8) and to said second guide (9).

11. A rotary telehandler (1) comprising:

a carriage (10) movable on wheels;

a turret (17) rotatably mounted on said carriage (10);

an actuating device configured for rotating said turret (17) relative to said carriage (10);

a pin (2) movable between a first position, wherein said pin (2) prevents a relative rotation between said turret (17) and said carriage (10), and a second position wherein said pin (2) allows a relative rotation between said turret (17) and said carriage (10);

characterised in that it the rotary telehandler further comprises an electric actuator (3) and a mechanical mechanism (4) connected or connectable to said pin (2) and to said electric actuator (3);

said electric actuator (3) being configured for moving, by means of said mechanical mechanism (4), said pin (2) between said first position and said second position and for exerting a thrust force on said pin (2) to keep the pin (2) in said first position for locking said telehandler (1) in an operating condition of road travel wherein the turret (17) is aligned with an axis of said carriage (10);

wherein said electric actuator (3) comprises a jack and wherein said mechanical mechanism (4) is connected or connectable to said jack in such a way as to transmit a motion of the jack (7) to said pin (2);

wherein said mechanical mechanism (4) is made in the form of an eccentric body comprising a guide in which said pin (2) is connected or connectable in a slidable fashion, said eccentric body being rotated by said electric actuator (3) and wherein said rotation of the eccentric body causes said pin (2) to translate.

12. A rotary telehandler (1) comprising:

a carriage (10) movable on wheels;

a turret (17) rotatably mounted on said carriage (10);

an actuating device configured for rotating said turret (17) relative to said carriage (10);

a pin (2) movable between a first position, wherein said pin (2) prevents a relative rotation between said turret (17) and said carriage (10), and a second position wherein said pin (2) allows a relative rotation between said turret (17) and said carriage (10);

characterised in that it the rotary telehandler further comprises an electric actuator (3) and a mechanical mechanism (4) connected or connectable to said pin (2) and to said electric actuator (3);

said electric actuator (3) being configured for moving, by means of said mechanical mechanism (4), said pin (2) between said first position and said second position and for exerting a thrust force on said pin (2) to keep the pin (2) in said first position for locking said telehandler (1) in an operating condition of road travel wherein the turret (17) is aligned with an axis of said carriage (10);

wherein said electric actuator (3) comprises a jack and wherein said mechanical mechanism (4) is connected or connectable to said jack in such a way as to transmit a motion of the jack (7) to said pin (2);

wherein said mechanical mechanism (4) is made in the form of a worm screw, and wherein said electric actuator (3) is connected or connectable to a pinion of the worm screw in such a way as to transform a rotational movement of said pinion into a translational movement of said pin (2).

* * * * *